(12) United States Patent
Ly

(10) Patent No.: US 11,279,109 B2
(45) Date of Patent: Mar. 22, 2022

(54) BREATHABLE COMPOSITE WITH MOVEABLE BAFFLES

(71) Applicant: The North Face Apparel Corp., Wilmington, DE (US)

(72) Inventor: John Ly, Oakland, CA (US)

(73) Assignee: The North Face Apparel Corp., Wilmington, DE (US)

( * ) Notice: Subject to any disclaimer, the term of this patent is extended or adjusted under 35 U.S.C. 154(b) by 223 days.

(21) Appl. No.: 16/502,188

(22) Filed: Jul. 3, 2019

(65) Prior Publication Data

US 2020/0009828 A1 Jan. 9, 2020

Related U.S. Application Data

(60) Provisional application No. 62/694,189, filed on Jul. 5, 2018.

(51) Int. Cl.
*B32B 5/26* (2006.01)
*A41D 31/02* (2019.01)
(Continued)

(52) U.S. Cl.
CPC ............... *B32B 5/26* (2013.01); *A41D 31/02* (2013.01); *A41D 31/085* (2019.02); *B32B 5/08* (2013.01);
(Continued)

(58) Field of Classification Search
CPC .... B32B 5/26; B32B 5/08; B32B 7/12; B32B 2437/00; B32B 2307/304; B32B 5/026; B32B 3/10; B32B 5/024; B32B 5/06; B32B 5/0276; B32B 2262/062; B32B 2262/0284; B32B 2307/724; B32B 5/022; B32B 2437/04; B32B 2262/0253;
(Continued)

(56) References Cited

U.S. PATENT DOCUMENTS

2004/0040087 A1 3/2004 Lack et al.
2013/0309929 A1* 11/2013 Ly .......................... B32B 5/022
442/247
(Continued)

FOREIGN PATENT DOCUMENTS

CA 3048049 A1 1/2020
CN 2363506 Y 2/2000
(Continued)

OTHER PUBLICATIONS

European Search Report and Search Opinion Received for EP Application No. 19182917.5, dated Feb. 25, 2020, 8 pages.

*Primary Examiner* — Brian Handville
(74) *Attorney, Agent, or Firm* — Smith, Gambrell & Russell LLP

(57) ABSTRACT

A composite fabric includes a first fabric layer and a plurality of insulating structures adjacent to the first fabric layer. Each of the plurality of insulating structures include a fabric shell defining a cavity and an insulating material located within the cavity. In further aspects a composite fabric includes a plurality of insulating structures separated by a plurality of spacers. Each of the plurality of spacers includes a fabric material and each of the plurality of insulating structures includes a fabric shell defining a cavity and an insulating material located within the cavity.

12 Claims, 3 Drawing Sheets

(51) Int. Cl.
  *B32B 5/08* (2006.01)
  *A41D 31/08* (2019.01)
  *B32B 7/12* (2006.01)

(52) U.S. Cl.
  CPC .......... *B32B 7/12* (2013.01); *B32B 2307/304* (2013.01); *B32B 2437/00* (2013.01)

(58) Field of Classification Search
  CPC .... B32B 2262/0261; B32B 2262/0246; B32B 2262/14; B32B 2262/08; B32B 2437/02; B32B 2250/20; B32B 3/16; B32B 5/02; A41D 31/02; A41D 31/085; A41D 31/065
  See application file for complete search history.

(56) References Cited

U.S. PATENT DOCUMENTS

| | | | |
|---|---|---|---|
| 2015/0017381 A1 | 1/2015 | Baychar | |
| 2015/0118438 A1* | 4/2015 | Yui | A43B 7/34 |
| | | | 428/101 |
| 2017/0099898 A1* | 4/2017 | Pezzimenti | A41D 1/04 |
| 2017/0172240 A1* | 6/2017 | Massey | A41D 31/04 |

FOREIGN PATENT DOCUMENTS

| | | |
|---|---|---|
| CN | 110682610 A | 1/2020 |
| EP | 3626096 A1 | 3/2020 |
| JP | 61-154618 A | 7/1986 |
| JP | 2020-006687 A | 1/2020 |
| KR | 10-1053255 B1 | 8/2011 |
| KR | 10-2018-0059937 A | 6/2018 |
| KR | 10-2020-0005468 A | 1/2020 |
| TW | 201717792 A | 6/2017 |
| TW | 202015894 A | 5/2020 |
| WO | 2017/062539 A1 | 4/2017 |

* cited by examiner

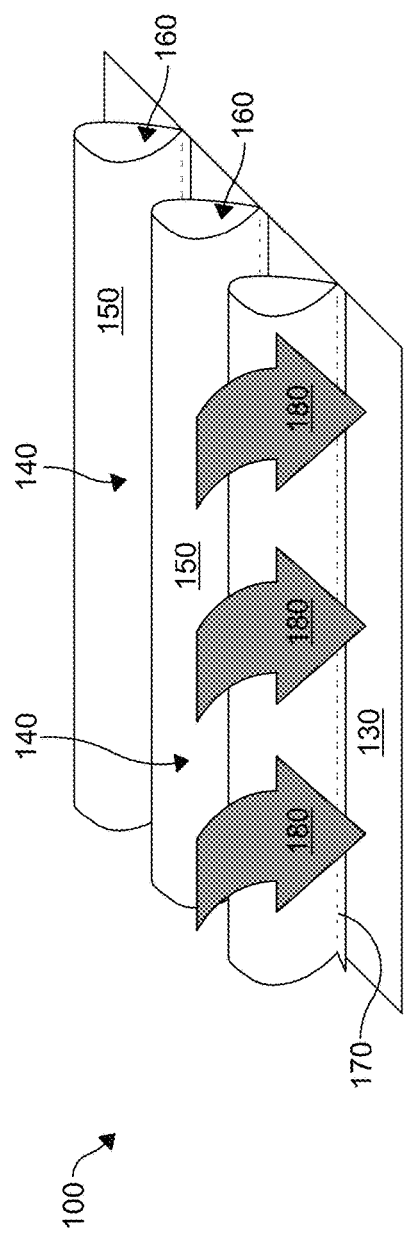
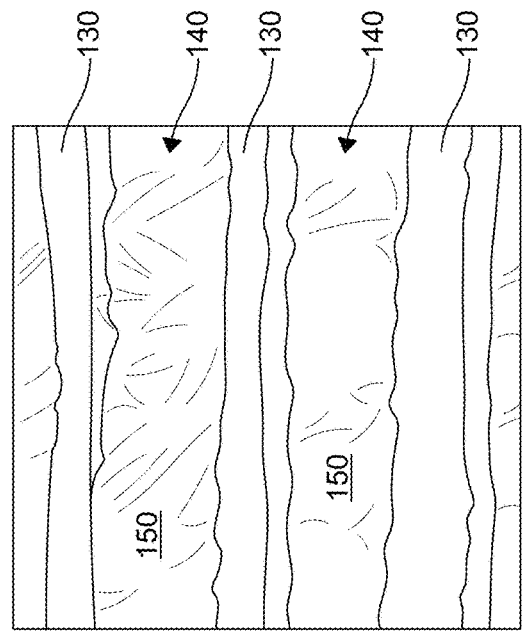
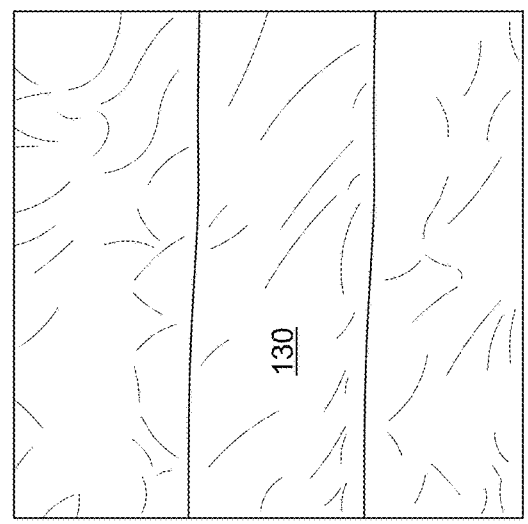

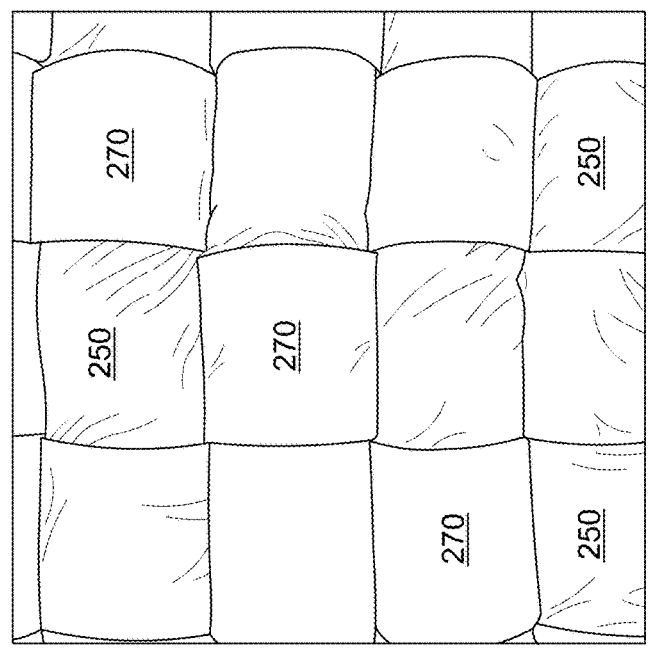
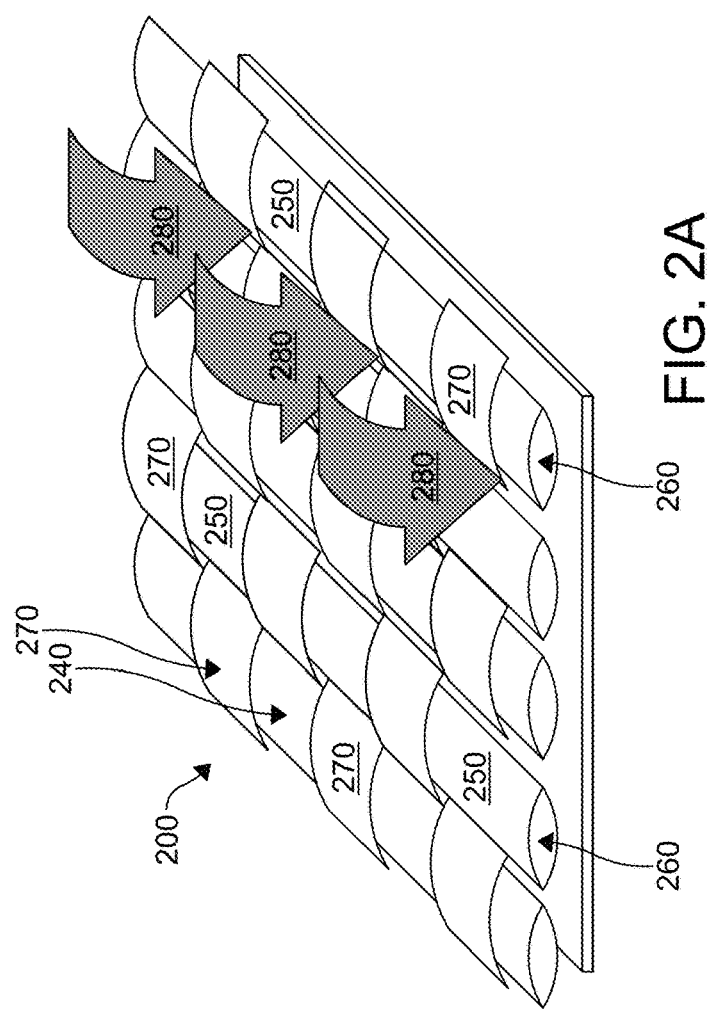

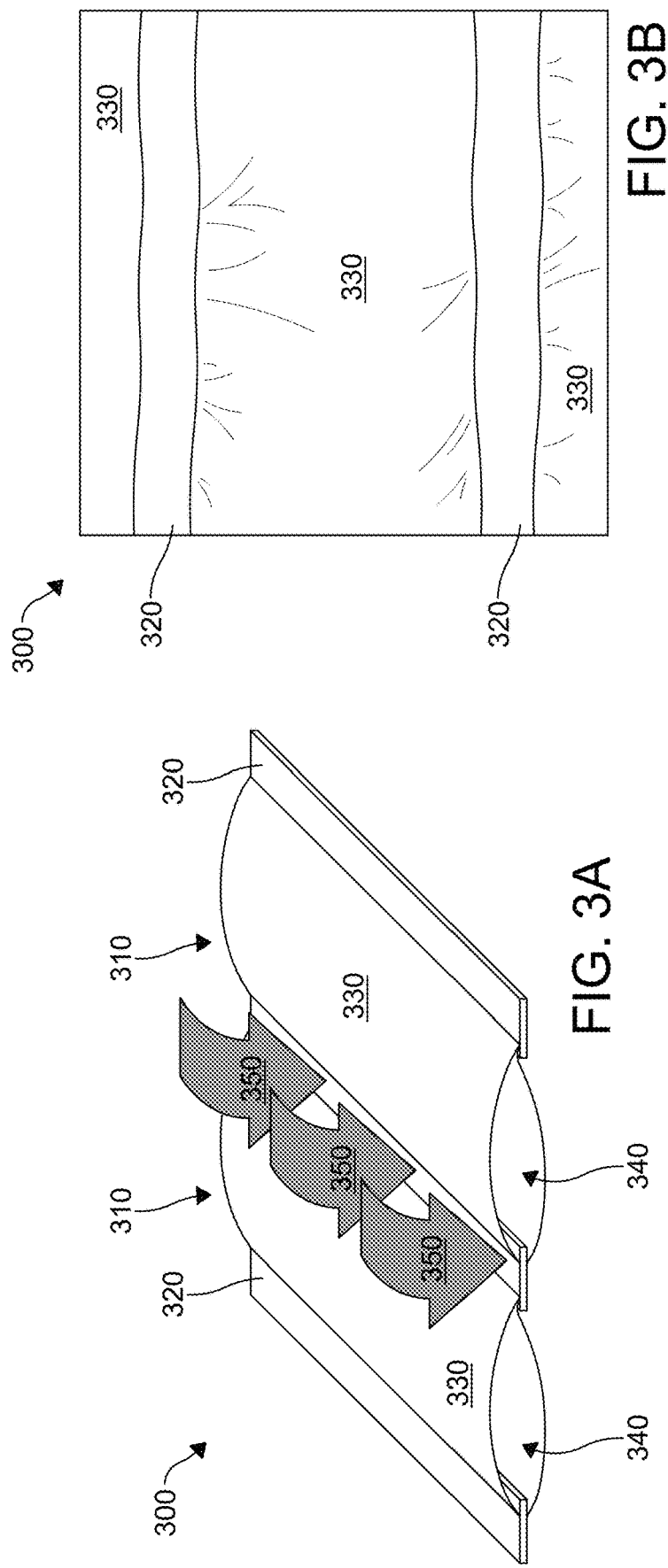

BREATHABLE COMPOSITE WITH MOVEABLE BAFFLES

CROSS-REFERENCE TO RELATED APPLICATIONS

This application is a nonprovisional of and claims the benefit to U.S. Provisional Application No. 62/694,189, filed Jul. 5, 2019, which is hereby incorporated by referenced in its entirety.

FIELD OF THE DISCLOSURE

The present disclosure relates to composite fabrics, and in particular to composite fabrics including a plurality of insulating structures that provide the composite fabric with thermal insulation.

BACKGROUND OF THE DISCLOSURE

An article of apparel may include a material including an insulator. Examples of insulators include, natural filler materials such as down (e.g., goose or duck plumage) and synthetic filler materials such as polyester. The insulator may move within the material. For example, the insulator may move as a result of use of the article, movement of a wearer of the article, and/or the force of gravity.

Additionally, the insulator may not be evenly distributed throughout the material. As an example, the insulator may not be evenly distributed throughout the material as a result of the insulator moving within the material. As another example, the insulator may not be evenly distributed throughout the material as a result of the method of manufacturing the material and/or the method of disposing the insulator within the material. Consequently, the article of apparel may have regions of varying thermal insulation.

These and other shortcomings are addressed by aspects of the disclosure.

SUMMARY

Aspects of the disclosure relate to a composite fabric including a first fabric layer and a plurality of insulating structures adjacent to the first fabric layer. Each of the plurality of insulating structures include a fabric shell defining a cavity and an insulating material located within the cavity.

Aspects of the disclosure further relate to a composite fabric including a plurality of insulating structures separated by a plurality of spacers. Each of the plurality of spacers includes a fabric material and each of the plurality of insulating structures includes a fabric shell defining a cavity and an insulating material located within the cavity.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1A is a top perspective view of a composite fabric according to an aspect of the disclosure.

FIG. 1B is a photograph of one side of the composite fabric of FIG. 1A.

FIG. 1C is a photograph of another side of the composite fabric of FIG. 1A.

FIG. 2A is a top perspective view of a composite fabric according to an aspect of the disclosure.

FIG. 2B is a photograph of the composite fabric of FIG. 2A.

FIG. 3A is a top perspective view of a composite fabric according to an aspect of the disclosure.

FIG. 3B is a photograph of the composite fabric of FIG. 3A.

DETAILED DESCRIPTION

The present disclosure can be understood more readily by reference to the following detailed description of the disclosure and the Examples included therein. In various aspects, the present disclosure pertains to composite fabrics including a first fabric layer and a plurality of insulating structures adjacent to the first fabric layer, each of the plurality of insulating structures including a fabric shell defining a cavity and an insulating material located within the cavity. Further aspects of the disclosure relate to a composite fabric including a plurality of insulating structures separated by a plurality of spacers, wherein each of the plurality of spacers includes a fabric material and each of the plurality of insulating structures includes a fabric shell defining a cavity and an insulating material located within the cavity.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an insulating material" includes mixtures of two or more insulating materials.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Composite Fabrics Including a First Fabric Layer and Insulating Structures

With reference to FIGS. 1A-2B, aspects of the disclosure relate to a composite fabric 100, 200 including a first fabric layer 130, 230 and a plurality of insulating structures 140, 240 adjacent to the first fabric layer 130, 230. In some aspects each of the plurality of insulating structures 140, 240 include a fabric shell 150, 250 defining a cavity 160, 260 and an insulating material (not shown) located within the cavity 160, 260.

The first fabric layer 130, 230 may be located on either side of a fabric and/or a garment formed therefrom. For example, in some aspects the first fabric layer 130, 230 is located on a body side of the composite fabric 100, 200, i.e., the side of the fabric facing towards the body of a user. In other aspects the first fabric layer 130, 230 is located on a face side of the composite fabric 100, 200, i.e., the side of the fabric facing away from the body of the user. In certain aspects the composite fabric 100, 200 is reversible such that a user of the fabric (e.g., a wearer of a garment including the composite fabric 100, 200) could use the composite fabric with the first fabric layer 130, 230 facing towards the user or away from the user. Also as used herein, "adjacent" means on or in proximity to and does not foreclose intervening components, including additional fabric layer(s), air or fluid.

With reference to FIG. 1A-1C, in some aspects each of the plurality of insulating structures 140 are attached to the first fabric layer 130. In particular aspects each of the plurality of insulating structures 140 are stitched 170 to the first fabric layer (bottom of insulating structure 140 shown as stitched directly to the first fabric layer 130. The plurality of insulating structures 140 could be attached to the first fabric layer 130 by any suitable method, such as with an adhesive, sewn, knit, welded or stitched.

The plurality of insulating structures 140 shown in FIGS. 1A-1C may in some aspects be loosely attached (or stitched 170) to the first fabric layer 130 such that they are free to move. When the fabric is used (e.g., worn), the plurality of insulating structures may lay down against the first fabric layer 130 (illustrated by the arrows 180), forming a warm insulating layer in the composite fabric 100.

With reference to FIGS. 2A and 2B, in further aspects each of the plurality of insulating structures 240 are retained against the first fabric layer 230 by a plurality of fabric strips 270. The plurality of fabric strips 270 may in some aspects retain the plurality of insulating structures 240 against the first fabric layer 230 in a woven construction. Any suitable weave pattern may be used. In some aspects the weave pattern is a plain weave (1×1, illustrated). In certain aspects the weave pattern is a satin weave or a twill weave (e.g., 1×2, 1×3, 2×2, etc.). The components of the composite fabric 200 can have any desirable dimensions. For example, in some aspects the plurality of insulating structures 240 are sized so that when the fabric is used (e.g., worn) the plurality of insulating structures 240 lie against and/or substantially cover the first fabric layer 230 (as shown by arrows 280), providing the composite fabric 200 with a layer of insulation.

The first fabric layer 130, 230 may have any suitable fabric construction. In some aspects the first fabric layer 130, 230 is a woven fabric. In other aspects the first fabric layer 130, 230 is a knit fabric, a nonwoven fabric or a laminate fabric. In particular aspects the first fabric layer 130, 230 includes taffeta, although any other suitable fabric material may be used, including but not limited to cotton, wool, nylon, polyester and combinations thereof.

In certain aspects the first fabric layer 130, 230 is highly breathable, or air permeable. Air permeability may be determined in accordance with ASTM D737, and is reported in cubic feet per minute (CFM). In some aspects the first fabric layer 130, 230 has an air permeability of from about 40 CFM to about 80 CFM when tested in accordance with ASTM D737. In particular aspects the first fabric layer 130, 230 has an air permeability of from about 50 CFM to about 60 CFM when tested in accordance with ASTM D737. The high air permeability of the first fabric layer 130, 230 provides a breathable layer to the composite fabric 100, 200 that allows moisture to pass therethrough.

The fabric shell 150, 250 can have any suitable fabric construction. In some aspects the fabric shell 150, 250 is a woven fabric, a knit fabric, a nonwoven fabric or a laminate fabric. In particular aspects the fabric shell 150, 250 includes taffeta, although any other suitable fabric material may be used, including but not limited to cotton, wool, polyester, nylon and combinations thereof.

It may be desirable in some aspects for the fabric shell 150, 250 to be substantially impermeable to air or to have a very low permeability. In particular aspects the fabric shell 150, 250 has an air permeability of from 0 CFM to about 5 CFM when tested in accordance with ASTM D737. In further aspects the fabric shell 150, 250 has an air permeability of from 0 CFM to about 2 CFM when tested in accordance with ASTM D737. The use of an impermeable or substantially impermeable fabric for the fabric shell 150, 250 provides warmth to the fabric and encapsulates the insulating material in the cavity 160, 260 to prevent or minimize migration or movement of the insulating material within the composite fabric 100, 200.

As noted, each of the plurality of insulating structures 140, 240 include a fabric shell 150, 250 defining a cavity 160, 260 and an insulating material located within the cavity 160, 260. Any suitable insulating material can be used, including a natural insulation material, a synthetic insulation material, or a combination thereof. In particular aspects the insulating material includes at least one natural insulating material, including down (e.g., goose or duck plumage). Other natural insulating materials that could be used in the composite fabric 100, 200 include, but are not limited to, cotton and wool. In further aspects the insulating material includes at least one synthetic insulating material, including polyester. Other synthetic insulating materials that could be used in the composite fabric 100, 200 include, but are not limited to, PrimaLoft®, Thinsulate™, Thermolite®, Quallofil®, ThermoBall™, polyethylene terephthalate, polypropylene, acrylic and combinations thereof. The insulating material may be inserted into the cavity by any conventional process, including but not limited to air blowing, insertion, injection, and rapier insertion. In addition, the insulating material may be in any form. In some aspects the insulating material is a loose fiber; in other aspects the insulating material is shaped (e.g., in a tubular form).

Composite Fabrics Including Insulating Structures and Spacers

With reference to FIGS. 3A and 3B, aspects of the disclosure further relate to a composite fabric 300 including a plurality of insulating structures 310 separated by a plurality of spacers 320. Each of the plurality of spacers 320 includes a fabric material, and each of the plurality of insulating structures 310 includes a fabric shell 330 defining a cavity 340 and an insulating material (not shown) located within the cavity 340.

In some aspects the composite fabric 300 is reversible such that a user of the fabric (e.g., a wearer of a garment including the composite fabric 300) could use the composite fabric 300 with either side facing towards the user or away from the user.

The plurality of spacers 320 may have any suitable fabric construction. In some aspects the plurality of spacers 320 are a woven fabric. In other aspects the plurality of spacers 320 are a knit fabric, a nonwoven fabric or a laminate fabric. In particular aspects the plurality of spacers 320 include taffeta, although any other suitable fabric material may be used, including but not limited to cotton, wool, polyester, nylon and combinations thereof. The plurality of spacers 320 can have any desirable dimensions. In some aspects—as illustrated—the plurality of spacers 320 are strips of fabric.

The plurality of spacers 320 and the fabric shell 330 can have any suitable dimensions. In a certain aspect the plurality of spacers 320 have a width of about 1 inch (1"), and the fabric shell 330 has a width of from about 5" to about 6". In addition, the plurality of spacers 320 and/or the fabric shell 330 could have varying dimensions within the same composite fabric 300. The plurality of spacers 320 may be sized so that when the fabric is used (e.g., worn) the plurality of insulating structures 310 lie against and/or substantially overlap or cover the plurality of spacers 320 (as shown by arrows 350), providing the composite fabric 300 with a layer of insulation.

In certain aspects the plurality of spacers 320 are highly air permeable. In some aspects the plurality of spacers 320 have an air permeability of from about 40 CFM to about 80 CFM when tested in accordance with ASTM D737. In particular aspects the plurality of spacers 320 have an air permeability of from about 50 CFM to about 60 CFM when tested in accordance with ASTM D737. The high air permeability of the plurality of spacers 320 provides a breathable component to the composite fabric 300 that allows moisture to pass therethrough.

The fabric shell 330 can have any suitable fabric construction. In some aspects the fabric shell 330 is a woven fabric, a knit fabric, a nonwoven fabric or a laminate fabric. In particular aspects the fabric shell 330 includes taffeta, although any other suitable fabric material may be used, including but not limited to cotton, wool, polyester, nylon and combinations thereof.

It may be desirable in some aspects for the fabric shell 330 to be substantially impermeable to air or to have a very low permeability. In particular aspects the fabric shell 330 has an air permeability of from 0 CFM to about 5 CFM when tested in accordance with ASTM D737. In further aspects the fabric shell 330 has an air permeability of from 0 CFM to about 2 CFM when tested in accordance with ASTM D737. The use of an impermeable or substantially impermeable fabric for the fabric shell 330 provides warmth to the fabric and encapsulates the insulating material in the cavity 340 to prevent or minimize migration or movement of the insulating material within the composite fabric 300.

As noted, each of the plurality of insulating structures 310 include a fabric shell 330 defining a cavity 340 and an insulating material located within the cavity 340. Any suitable insulating material can be used, including a natural insulation material, a synthetic insulation material, or a combination thereof. In particular aspects the insulating material includes at least one natural insulating material, including down (e.g., goose or duck plumage). Other natural insulating materials that could be used in the composite fabric 300 include, but are not limited to, cotton and wool. In further aspects the insulating material includes at least one synthetic insulating material, including polyester. Other synthetic insulating materials that could be used in the composite fabric 300 include, but are not limited to, PrimaLoft®, Thinsulate™, Thermolite®, Quallofil®, ThermoBall™, polyethylene terephthalate, polypropylene, acrylic and combinations thereof. The insulating material may be inserted into the cavity by any conventional process, including but not limited to air blowing, insertion, injection and rapier insertion. In addition, the insulating material may be in any form. In some aspects the insulating material is a loose fiber; in other aspects the insulating material is shaped (e.g., in a tubular form).

The composite fabrics 100, 200, 300 and the components thereof may be formed according to conventional processes (e.g., conventional sewing, weaving and knitting processes).

The composite fabrics 100, 200, 300 described herein may be incorporated into a fabric and used to manufacture articles. Exemplary articles include articles of apparel, such as jackets, pants, hats, gloves, jumpsuits, and other outerwear. Other exemplary articles include, but are not limited to, blankets, sporting equipment (e.g., the lining of a helmet) and outdoor equipment.

Various combinations off elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A composite fabric comprising:
a first fabric layer; and
a plurality of insulating structures adjacent to the first fabric layer, each of the plurality of insulating structures comprising a fabric shell defining a cavity and an insulating material located within the cavity.

Aspect 2. The composite fabric according to Aspect 1, wherein each of the plurality of insulating structures are attached to the first fabric layer.

Aspect 3. The composite fabric according to Aspect 1 or 2, wherein each of the plurality of insulating structures are stitched to the first fabric layer.

Aspect 4. The composite fabric according to Aspect 1, wherein each of the plurality of insulating structures are retained against the first fabric layer by a plurality of fabric strips.

Aspect 5. The composite fabric according to Aspect 4, wherein the plurality of fabric strips retain the plurality of insulating structures against the first fabric layer in a woven construction.

Aspect 6. The composite fabric according to any of Aspects 1 to 5, wherein the first fabric layer comprises a woven fabric or a knit fabric.

Aspect 7. The composite fabric according to any of Aspects 1 to 6, wherein the first fabric layer has an air permeability of from about 40 cubic feet per minute (CFM) to about 80 CFM when tested in accordance with ASTM D737.

Aspect 8. The composite fabric according to any of Aspects 1 to 6, wherein the first fabric layer has an air permeability of from about 50 CFM to about 60 CFM when tested in accordance with ASTM D737.

Aspect 9. The composite fabric according to any of Aspects 1 to 8, wherein the fabric shell comprises a woven fabric, a knit fabric, a nonwoven fabric or a laminate fabric.

Aspect 10. The composite fabric according to any of Aspects 1 to 9, wherein the fabric shell has an air permeability of from 0 CFM to about 5 CFM when tested in accordance with ASTM D737.

Aspect 11. The composite fabric according to any of Aspects 1 to 10, wherein the fabric shell has an air permeability of from 0 CFM to about 2 CFM when tested in accordance with ASTM D737.

Aspect 12. The composite fabric according to any of Aspects 1 to 11, wherein the insulating material comprises a natural insulating material, a synthetic insulating material, or a combination thereof.

Aspect 13. The composite fabric according to Aspect 12, wherein the natural insulating material comprises down, cotton, wool or a combination thereof.

Aspect 14. The composite fabric according to Aspect 12, wherein the synthetic insulating material comprises polyester, polyethylene terephthalate, polypropylene, acrylic, PrimaLoft®, Thinsulate™, Thermolite®, Quallofil®, ThermoBall™ and combinations thereof.

Aspect 15. A composite fabric comprising a plurality of insulating structures separated by a plurality of spacers, wherein each of the plurality of spacers comprises a fabric material and each of the plurality of insulating structures comprises a fabric shell defining a cavity and an insulating material located within the cavity.

Aspect 16. The composite fabric according to Aspect 15, wherein the fabric material comprises a woven fabric, a knit fabric, a nonwoven fabric or a laminate fabric.

Aspect 17. The composite fabric according to Aspect 15 or 16, wherein the fabric material has an air permeability of from about 40 CFM to about 80 CFM when tested in accordance with ASTM D737.

Aspect 18. The composite fabric according to any of Aspects 15 to 17, wherein the fabric material has an air permeability of from about 50 CFM to about 60 CFM when tested in accordance with ASTM D737.

Aspect 19. The composite fabric according to any of Aspects 15 to 18, wherein the fabric shell comprises a woven fabric, a knit fabric, a nonwoven fabric or a laminate fabric.

Aspect 20. The composite fabric according to any of Aspects 15 to 19, wherein the fabric shell has an air permeability of from 0 CFM to about 5 CFM when tested in accordance with ASTM D737.

Aspect 21. The composite fabric according to any of Aspects 15 to 20, wherein the fabric shell has an air permeability of from 0 CFM to about 2 CFM when tested in accordance with ASTM D737.

Aspect 22. The composite fabric according to any of Aspects 15 to 21, wherein the insulating material comprises a natural insulating material, a synthetic insulating material, or a combination thereof.

Aspect 23. The composite fabric according to Aspect 22, wherein the natural insulating material comprises down, cotton, wool or a combination thereof.

Aspect 24. The composite fabric according to Aspect 23, wherein the synthetic insulating material comprises polyester, polyethylene terephthalate, polypropylene, acrylic, PrimaLoft®, Thinsulate™, Thermolite®, Quallofil®, ThermoBall™ and combinations thereof.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A composite fabric comprising:
a first fabric layer; and
a plurality of discontinuous insulating structures disposed adjacent to and loosely attached to the first fabric layer, wherein the bottom of the insulating structure is attached directly to the first fabric layer via a seam such that each of the insulating structures is free to move about an axis along the seam directly coupling an insulating structure to the first fabric layer, each of the plurality of structures comprising a fabric shell defining a cavity and an insulating material located within the cavity.

2. The composite fabric according to claim 1, wherein each of the plurality of insulating structures is attached to the first fabric layer.

3. The composite fabric according to claim 1, wherein each of the plurality of insulating structures is stitched to the first fabric layer.

4. The composite fabric according to claim 1, wherein the first fabric layer comprises a woven fabric or a knit fabric.

5. The composite fabric according to claim 1, wherein the first fabric layer has an air permeability of from about 40 cubic feet per minute (CFM) to about 80 CFM when tested in accordance with ASTM D737.

6. The composite fabric according to claim 1, wherein the first fabric layer has an air permeability of from about 50 CFM to about 60 CFM when tested in accordance with ASTM D737.

7. The composite fabric according to claim 1, wherein the fabric shell comprises a woven fabric, a knit fabric, a nonwoven fabric or a laminate fabric.

8. The composite fabric according to claim 1, wherein the fabric shell has an air permeability of from 0 CFM to about 5 CFM when tested in accordance with ASTM D737.

9. The composite fabric according to claim 1, wherein the fabric shell has an air permeability of from 0 CFM to about 2 CFM when tested in accordance with ASTM D737.

10. The composite fabric according to claim 1, wherein the insulating material comprises a natural insulating material, a synthetic insulating material, or a combination thereof.

11. The composite fabric according to claim 10, wherein the natural insulating material comprises down, cotton, wool or a combination thereof.

12. The composite fabric according to claim 10, wherein the synthetic insulating material comprises polyester, polyethylene terephthalate, polypropylene, acrylic and combinations thereof.

* * * * *